C. A. GRÜNEWALD.
FILING APPARATUS.
APPLICATION FILED APR. 29, 1913.

1,150,674.

Patented Aug. 17, 1915.
7 SHEETS—SHEET 1.

Witnesses:
Charles B. Compton
Fred Pohl

C. A. Grünewald
Inventor:
by
Brogdon Marks
Attorney

C. A. GRÜNEWALD.
FILING APPARATUS.
APPLICATION FILED APR. 29, 1913.

1,150,674.

Patented Aug. 17, 1915.
7 SHEETS—SHEET 2.

Witnesses:
Charles B Crompton
Fred Pohl

C. A. Grünewald.
Inventor:
by
Attorney

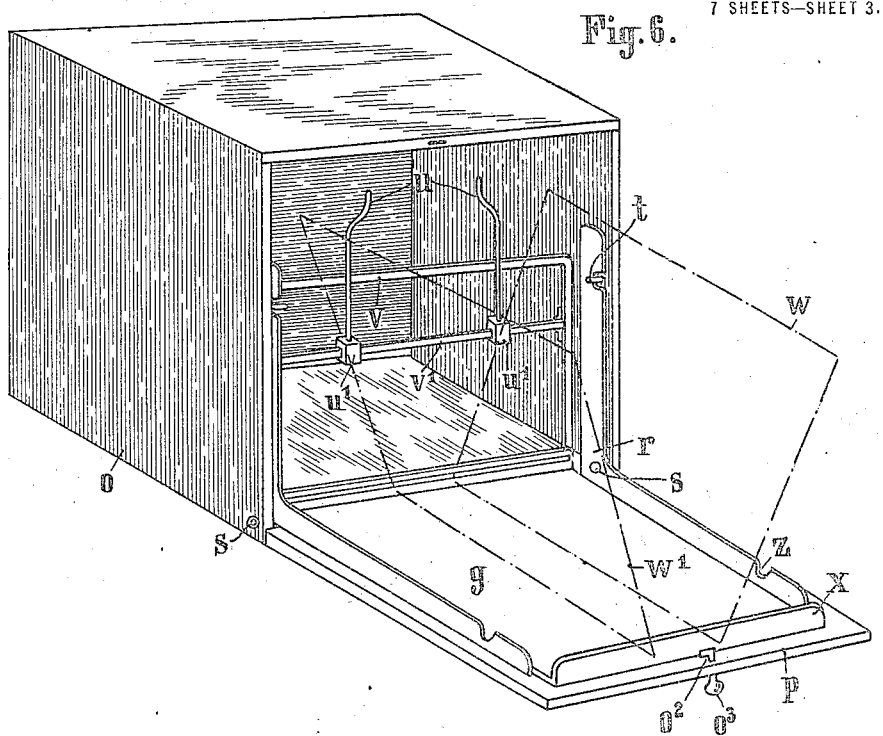
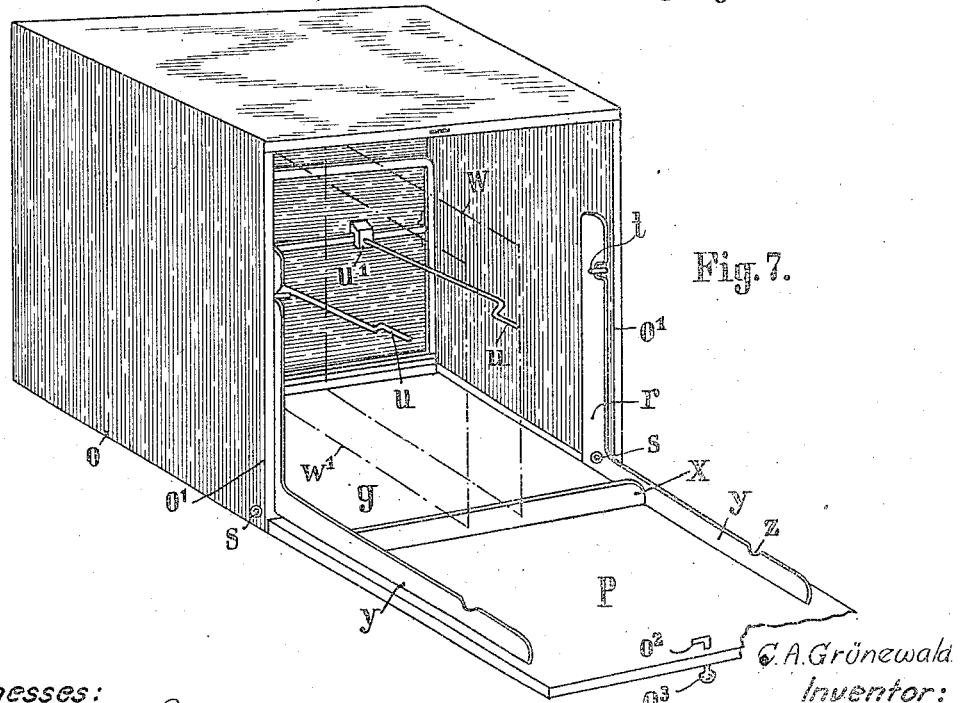

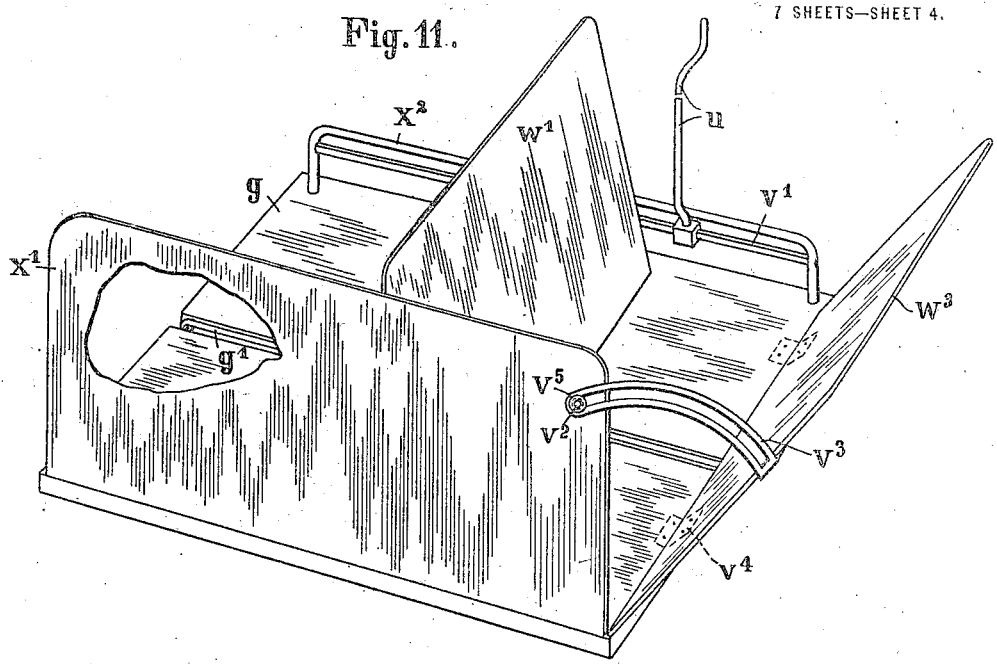
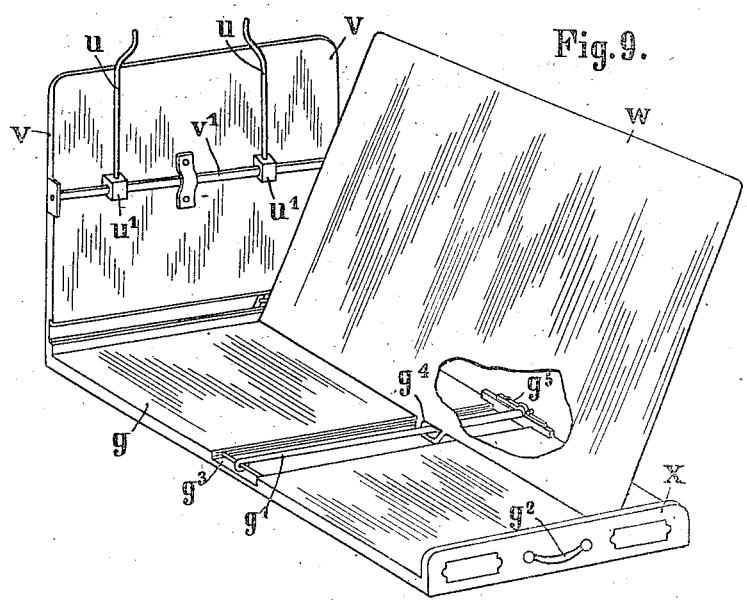

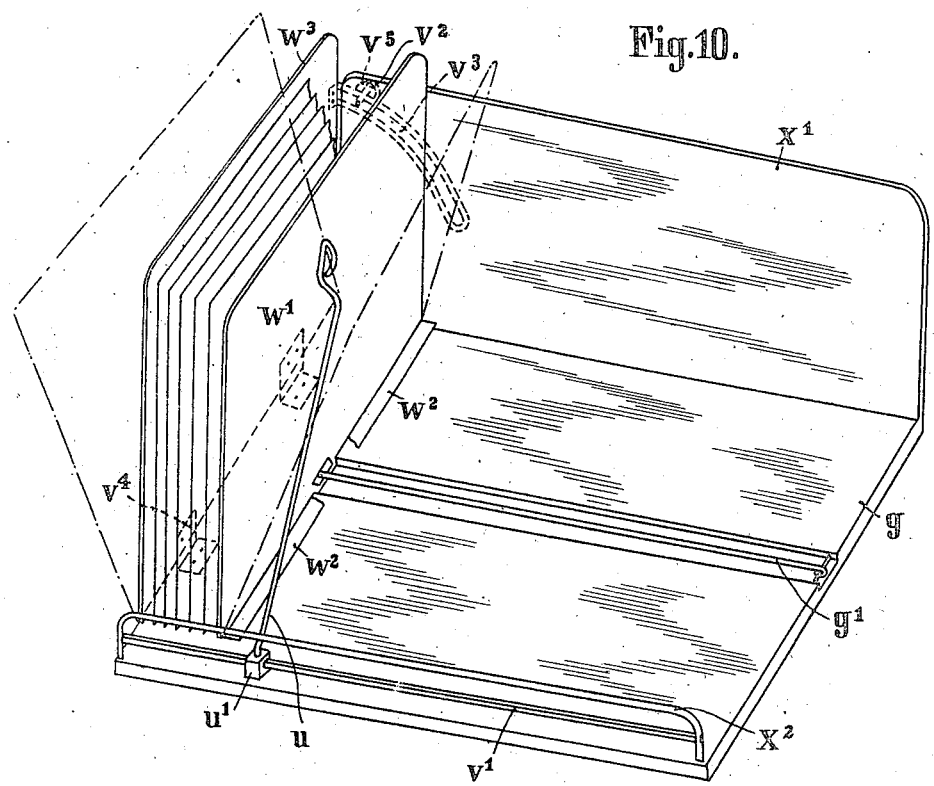

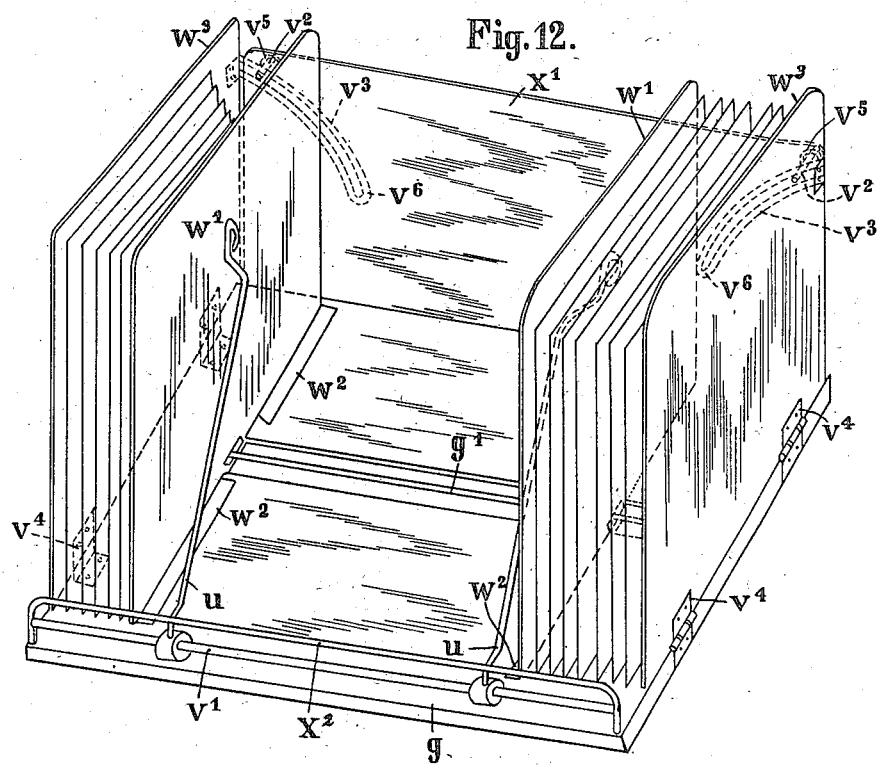

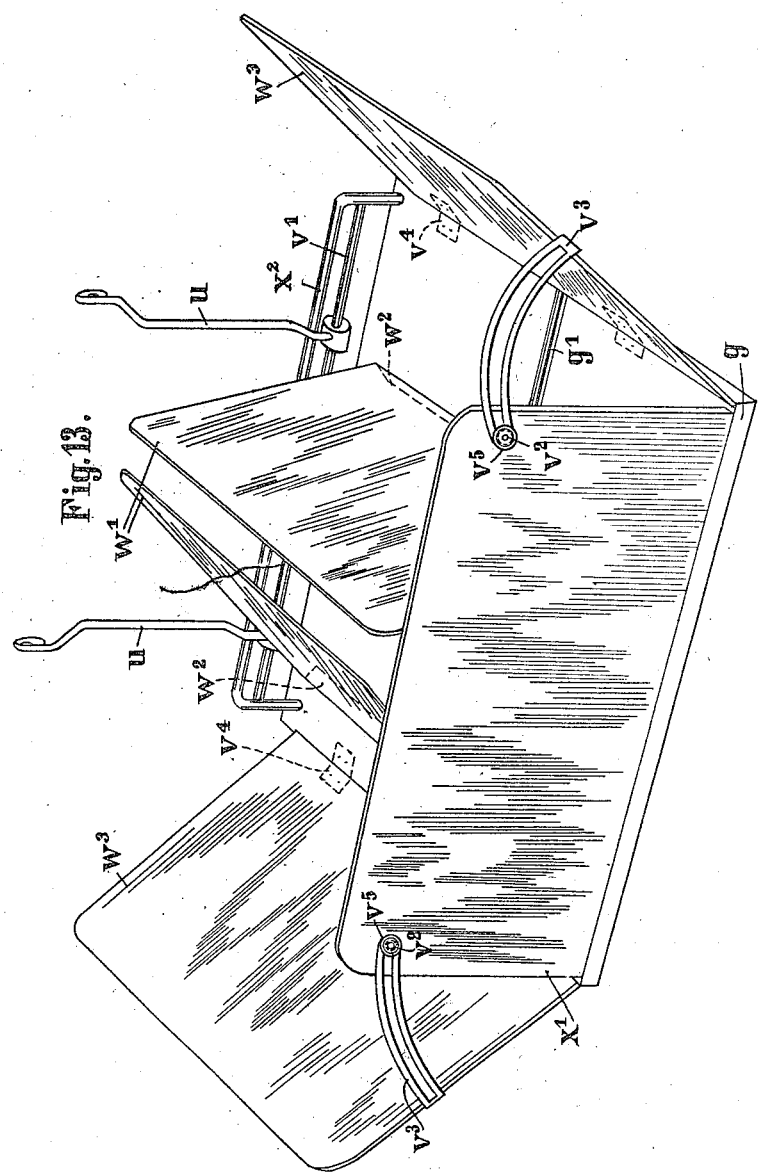

UNITED STATES PATENT OFFICE.

CARL ALOYS GRÜNEWALD, OF HANOVER, GERMANY.

FILING APPARATUS.

1,150,674.   Specification of Letters Patent.   Patented Aug. 17, 1915.

Application filed April 29, 1913.   Serial No. 764,411.

*To all whom it may concern:*

Be it known that I, CARL ALOYS GRÜNEWALD, a subject of the German Emperor, and residing at 38 Schneiderberg, Hanover, Germany, have invented certain new and useful Improvements in Filing Apparatus, of which the following is a specification.

This invention relates to filing cabinets and the like.

The object of the present invention is to improve such filing devices whereby the documents can be filed with an accessibility hitherto unattainable, and with rapidity and certainty, and the filed documents can be consulted with equal speed, suitable devices being provided for enabling the filing apparatus to be operated with a rapidity hitherto unknown and also to insure great durability notwithstanding an intensive use, and finally enabling these apparatus to be arranged on or in or built into existing office furniture.

According to this invention a vertical filing drawer is arranged on a specially constructed supporting frame in such a manner as to allow said frame to be built into existing office furniture, while the vertical filing drawer has a mobility and yet a firm support such that the said supporting frame can be drawn out easily and conveniently together with the vertical filing drawer from the office furniture and moved back into the same. By this means the vertical filing drawer is rendered conveniently accessible while its special construction offers the further advantages of convenience, ease in handling and of enabling the documents to be turned over like the leaves of a book.

Figure 1:
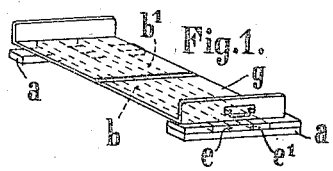
Figure 2:
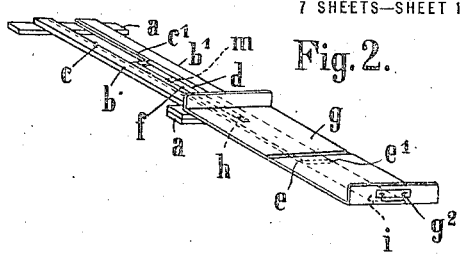
Figure 3:
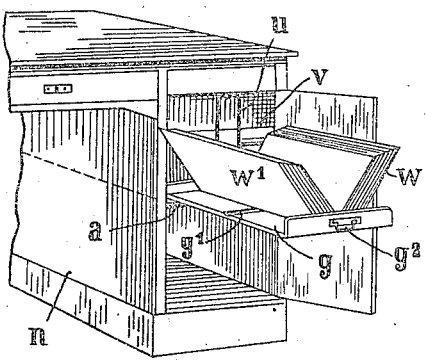
Figure 4:
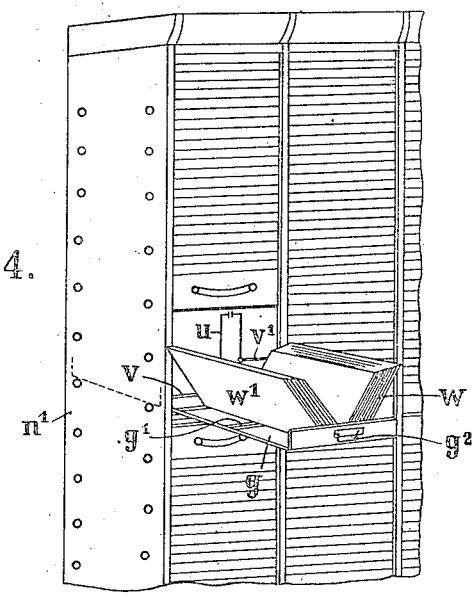
Figure 5:
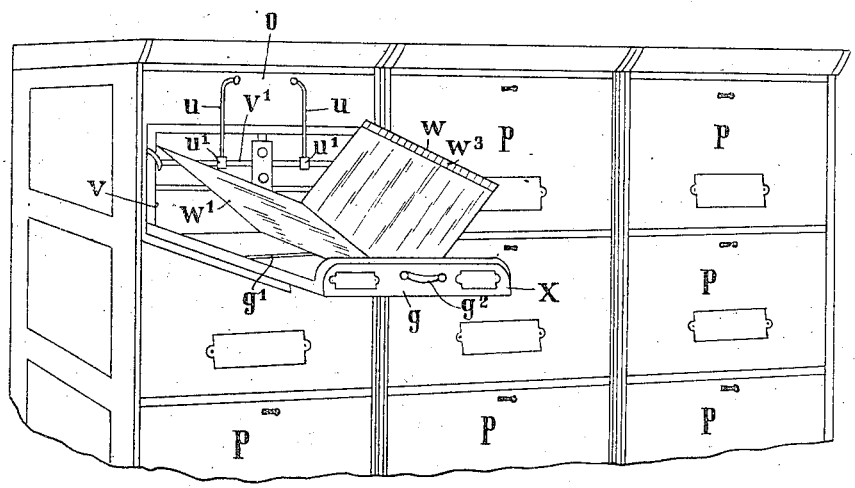
Figure 8:
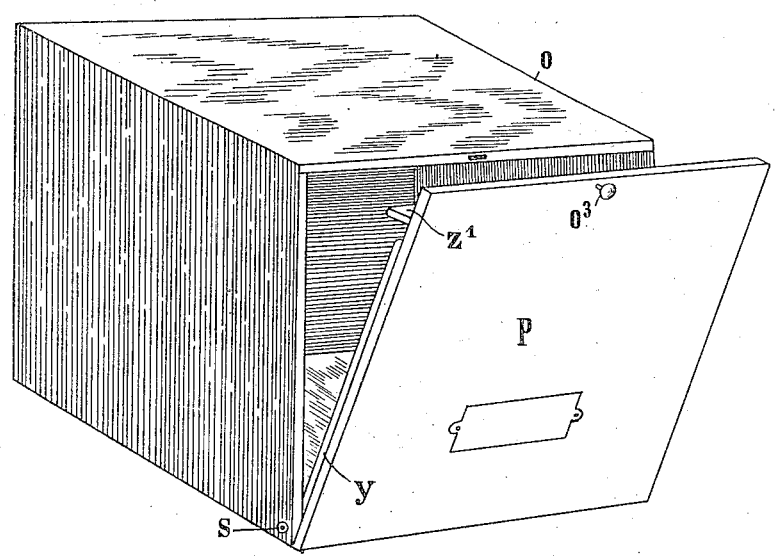

Several modifications of the present invention are illustrated by way of example in the accompanying drawings, in which:

Figure 1 is a perspective view of a vertical filing drawer with the improved supporting frame arranged thereon, in the closed position, the letter filing device being omitted for the sake of clearness. Fig. 2 is a perspective view of the same construction in the completely drawn out position, the letter filing device being similarly omitted for the sake of clearness. Fig. 3 is a perspective view of part of a desk with the improved apparatus arranged therein and showing also the letter filing device. Fig. 4 shows the same construction fitted in a shelf cabinet. Fig. 5 shows the vertical filing drawer with its special devices arranged in a filing cabinet. Fig. 6 shows the same arrangement in a pigeonhole box in the position of use, that is to say fitted in a single box of the filing cabinet shown in Fig. 5. Fig. 7 shows the same construction pushed home into the box. Fig. 8 shows a box of this kind with a dust tight fall-down front partly open. Figs. 9, 10, 11, 12 and 13 illustrate modifications of constructions suitable for the arrangements shown in Figs. 1 to 6, provided on the vertical filing drawer for filing the documents.

In carrying the invention into effect as illustrated for the purpose of insuring the ready mobility of the improved filing apparatus and consequently an extremely rapid working with the latter, the vertical filing drawer $g$ is provided with an actuating device consisting of an under frame $a$ having two connecting or guiding members $b$ $b'$ formed on their inner sides with grooves $c$ and $c'$. A bar $d$ is slidable in these grooves $c$ and $c'$ by means of projections $e$ and $e'$ engaging in the said grooves. The bar $d$ has a groove-like dove-tail recess $f$ in which is slidably mounted a slide $h$ of corresponding dove-tail shape arranged on the lower part of the vertical filing drawer $g$. The drawer $g$ has further in its underside a groove like recess $i$ fitting the bar $d$. A stop $m$ on the lower bar $d$ limits the movement of the bar $d$ and consequently of the drawer $g$.

The drawer $g$ has mounted on it the vertical filing apparatus $u$, $v$, $v'$, $w$, $w'$ which may be constructed according to the various modifications shown in Figs. 9, 10, 11, 12 and 13.

The hereinbefore described general arrangement may either be built into an existing article of office furniture as shown for example in Fig. 3 in the case of a writing table $n$ and in Fig. 4 in the case of a shelf $n'$, or in Fig. 5 in the case of a filing cabinet, or as shown in Figs. 6, 7 and 8 in the case of pigeon hole boxes $o$ constituting a filing cabinet. In such cases the under frame $a$ of the improved supporting frame is fixed in this article of office furniture in such a manner that the vertical filing apparatus, $u$, $v$, $v'$, $w$ and $w'$ arranged on the drawer $g$ in its position of use can be drawn out of the article of office furniture (Figs. 3, 4, 5 and 6) owing to its sliding construction and is then ready for use.

For the purpose of insuring the durability of the filing apparatus and also the cleanliness of its contents in view of the intensive use of such apparatus in a large and busy office, the container or receptacle shown in Fig. 5 may consist of a filing cabinet composed of pigeon hole boxes $o$ shown in Figs. 6 to 8.

Each pigeon hole box $o$ has a fall-down front $p$ which is pivoted to the box $o$ on pins $s$ by means of supporting angle bars $r$. On the box $o$ are provided stops $t$ which keep the supporting angle bars $r$ in such a position that the fall-down front $p$ will be kept horizontal when the letter filing drawer is pulled out (Fig. 6). To close the box, it is merely necessary to turn the filing wires $u$ (hereinafter described) of the closing device $v$ of the vertical filing drawer (after having placed the covers $w$ and $w'$ (Fig. 7) in the vertical position), down into the horizontal position and to push the vertical filing drawer $g$ into the box $o$ by means of the front wall $x$ which serves as a handle. Then the front $p$ is turned up (Fig. 8), recesses $z$, Fig. 7, being provided in the limb $y$ of the supporting brackets $r$ in order that the closing of the front limbs $p$ shall not be interfered with by the limbs striking against the stops $t$. The limbs $y$ which have hitherto been horizontal of the supporting angles $r$ will now form a dust-tight closure along the sides $o'$ of the pigeon hole or of the box $o$, while the limbs $y'$ of the supporting angle bars $r$ constitute at the same time lateral guides for the vertical filing drawer $g$ similar to the actuating device or to the supporting frame $a$, $b$, $c$, $d$, $e$, $f$. By this means an extremely durable and securely operating support in the case of continuous use is provided for the pivoted fall-down front $p$ as well as for the sliding vertical filing apparatus, so that the filing apparatus will work properly in spite of intensive use.

A stop $z'$, Fig. 8, may be provided on the inside of the fall-down front $p$ for the purpose of insuring a dust tight closure of the box $o$ at the top. Any desired fastening device $o^2$ and a knob $o^3$ may be provided for actuating the dust tight receptacle.

The vertical filing drawer which can be operated with extreme ease and rapidity in combination with the various articles of office furniture may be employed in various constructions as shown in Figs. 3, 5, 6, 9, 10, 11, 12 and 13.

The frame $v$ shown in Fig. 6 or plate $v$ as shown in Fig. 9 has a guiding bar $v'$ along which two filing wires $u$ can be moved from the center toward the ends and vice versa by means of two clips $u'$, whereby these wires can be adjusted to the exact thickness of the contents of the file and can also be turned on their guide bar from their vertical position shown in Figs. 3, 4, 5 and 6 into their horizontal position shown in Fig. 7 for the purpose of engaging the two file covers $w$, $w'$ and holding them in their vertical position, the clips $u'$ on the guide bar $v'$ holding the wires in each position by canting pressure. Each of these vertical drawers is provided as shown in Figs. 3, 4, 5, 9, 10, 11, 12, 13 with a transverse removable and fixable slide bar $g'$ of any suitable cross section which in addition for guiding the covers $w$ and $w'$ serves also as a slide bar for the indicator cards $w^3$, file cases, clamping devices or the like.

As shown in Fig. 9, the vertical filing drawer $g$ is further provided with a low front wall $x$ and a frame like back wall $v$, which latter carries the holding and closing devices $v'$, $u'$ and $u$ for the covers $w$, $w'$.

The wider groove $g^3$ extending in the middle of the base plate receives the lockable slide bar $g'$. On this slide bar between the inclined covers $w$, $w'$ provided with guiding eyelets $g^4$ there may be slipped as already above stated further indicator cards and file covers also provided with eyelets $g^4$. The slide bar $g'$ may be connected in a readily disconnectable manner to the base plate by means of any suitable fastening or locking device $g^5$, $g^2$ is a handle for pulling out the drawer.

For the purpose of adapting the shape of the vertical filing drawer to the various constructions and arrangements of office furniture as shown in Figs. 3, 4 and 5 and especially for facilitating the building into writing desks and the like as shown in Fig. 3, the vertical drawer shown in Figs. 10 and 11 is constructed in such a manner that one of the two covers serving for holding the contents of the file is pivoted by means of hinges or the like to the base plate and is guided by means of an arc-shaped sector or the like so that it can be held in its inclined open position, while the other cover $w'$ in the same manner as shown in Fig. 9, can automatically adjust itself into the inclined position by means of the limited inclination of the eyelets $g^4$, or by angular projections $w^2$ as well as be held in the closed position by means of a single adjustable holding and closing device.

The drawer $g$ which serves also as a base plate is provided, as shown in Fig. 10, with a low front wall $x^2$ constructed in the form of a wire frame or the like, containing the sliding or guiding bar $v'$ for a clip $u'$ which carries the aforesaid folding filing wire $u$.

This front wall $x$ is made low in order that it shall serve only as a ledge like stop for the contents of the file. The higher back wall $x'$, Figs. 10 and 11, is provided, for example, on its outer side, with a stop pin $v^2$, Fig. 11, coöperating with the sector bar $v^3$ or similar holding device which holds in its inclined position the cover $w^3$ that is hinged at $v^4$ to a side of the base plate $g$. The arc shaped bar or sector $v^3$ is here fastened to the movable side wall $w^3$ and can be adjusted as desired by means of a nut $v^5$. On unscrewing the nut $v^5$ the cover or side wall $w^3$ of the vertical drawer $g$ falls into an inclined open position which is limited by the end of the groove in the sector bar $v^3$ striking the stop $v^2$, Fig. 11.

The second cover $w'$ is slidably held by the transverse slide bar $g'$ and assumes an inclined position when the filing wire $u$ is loosened, owing to the action of the angle projections or bent portions $w^2$ that serve as bottom stops.

The holding and closing filing wire $u$ is cranked to some extent at its lower end to enable it to be raised to the vertical position notwithstanding the low front wall $x$.

In the same manner as in using the vertical filing drawers with covers pivoted at one side, for desks, it may be desirable for instance in the case of shelves and the like as shown in Fig. 4, to construct the same apparatus as a duplex vertical filing drawer for the purpose of enabling the documents filed in a single file to be subdivided, for instance as may be desirable in the case of law suits. By means of this duplex vertical filing drawer documents which are separately filed but belong to one another may be filed away in a single file and when the covers are open the two sets of documents are visible on either side of the file, like the leaves of an open book lying flat on its back in one and the same vertical file, so that, for example, corresponding documents or papers setting out opposite views are rendered visible as has never been done yet in a single file.

Fig. 12 is a front elevation of the duplex vertical filing drawer in the closed condition, and Fig. 13 is a rear elevation of the duplex vertical filing drawer in its open condition. As shown in these figures, the base plate of this duplex vertical filing drawer $g$ is provided with a front wall $x^2$ composed, for instance of a strong wire frame or the like which carries the guiding bar $v'$ for the folding filing wires $u$. The higher fixed back wall $x'$ is provided on its outside with stop pins $v^2$ which coöperate with the arc-shaped sector bars $v^3$ or the like holding devices which hold in an inclined position the outer covers $w^3$ that are hinged at $v^4$ to the two sides of the base plate. These two pivoting covers $w^3$ which constitute at the same time the sides of the vertical filing drawer are important for the practical utilization of these modifications shown in Figs. 12 and 13. The arc-shaped sector bars $v^3$ are in these cases fixed, for instance, to the outer covers $w$ and can be adjusted as desired by means of set nuts $v^5$.

In Fig. 12 the outer covers $w^3$ are shown screwed fast in the vertical position. On loosening the nuts $v^5$ they fall into the inclined open position, Fig. 13, after the vertical filing drawer has been pulled out of the container (for instance the shelf cabinet shown in Fig. 4) until the ends $v^6$ of the sector bars $v^3$ strike the stop pins $v^2$.

The two inner covers $w^1$ corresponding to the two outer covers $w^3$ are slidably arranged on the transverse slide bar $g'$ and they assume the inclined position after the filing wires $u$ have been loosened, owing to the action of the angular stops or bent portions $w^2$ that serve as bottom stops. The filing wires $u$ are also somewhat cranked at their lower ends as in the construction shown in Fig. 10, in order that they may be able to assume an upright position notwithstanding the low front wall frame $x$. Each of the two files thus formed in a single vertical filing drawer can in this arrangement as shown in Fig. 12 be brought into the visible open position shown in Fig. 13 which not only allows of readily reading, turning over the leaves and filing the documents but also facilitates a comparison of the contents of the one file with the contents of the other file.

In the case of files which are not very full it is sufficient to turn up only the filing wires $u$ and to allow the outer covers $w$ to remain in their vertical positions.

The general arrangements of the drawer which is extremely easy to move and yet is firmly supported with the particularly convenient improved filing apparatus arranged thereon, provides a vertical filing cabinet which is able to satisfy the highest requirements of a great business as regards certainty, durability, rapidity of filing, accessibility and visibility in use, finding the documents, and cleanliness and neatness in storing same. This constitutes a device, the high practical value of which will be particularly appreciated where a large number of documents have to be filed daily and consulted again quickly without having to damage the documents by perforations or the like.

Having now described my invention what I claim as new and desire to secure by Letters Patent is:—

1. Filing apparatus comprising in combination a base plate slidably mounted in or upon an article of furniture, a low front wall provided upon the base plate and serving as a stop or ledge for the contents of the file, a rear wall provided on the base plate, movable covers or walls between which the matters are to be filed, means for adjustably mounting the covers upon the base plate so that said covers or walls are adapted to assume an inclined position thus allowing the contents to be inspected like the leaves of an open book, and means for holding the covers or walls in the closed position.

2. Filing apparatus comprising in combination, a base plate slidably mounted in or upon an article of furniture, a low front wall provided upon the base plate and serving as a stop or ledge for the contents of the file, a rear wall provided on the base plate, movable covers between which the matters are to be filed, means for adjustably mounting the covers upon the base plate so that said covers are adapted to assume an inclined position, elements for holding the covers in the closed position, means for mounting and guiding said elements upon one of the walls, and means for securing said elements so that their position may be adjusted to suit the position of the covers.

3. Filing apparatus comprising in combination, a base plate slidably mounted in or upon an article of furniture, a low front wall provided upon the base plate and serving as a stop or ledge for the contents of the file, a rear wall provided on the base plate, movable covers adjustably mounted upon said base plate by means of eyelets or the like slidable upon a transverse bar whereby when the base plate is pulled out the covers are adapted to assume an inclined position, elements for holding the covers in the closed position, means for mounting and guiding said elements upon one of the walls, and means for securing said elements so that their position may be adjusted to suit the position of the covers.

4. Filing apparatus comprising in combination, a base plate slidably mounted in or upon an article of furniture, a low front wall provided upon the base plate and serving as a stop or ledge for the contents of the file, a rear wall provided on the base plate, movable covers adjustably mounted upon said base plate, by means of eyelets or the like slidable upon a transverse bar whereby when the base plate is pulled out the covers are adapted to assume an inclined position, elements for holding the covers in the closed position, a guide bar upon which said elements are mounted, and frictional means for adjustably securing said elements upon the guide bar.

5. Filing apparatus comprising in combination a base plate slidably mounted in or upon an article of furniture, a low front wall provided upon the base plate serving as a stop or ledge for the contents of the file, a higher rear wall secured to the base plate, movable covers and indexes adjustably mounted upon said base plate by means of eyelets or the like slidable upon a transverse bar, elements adapted to bear upon one or more of said covers or walls for retaining the same and the contents of the file in the closed position, a guide bar upon which the said elements are mounted, frictional means for adjustably securing said elements upon the guide bars so that their position may be adjusted, and means whereby when the apparatus is pulled out and the mechanism retaining the movable covers is rendered inoperative by rotating the same upon the said guide bar out of contact with the said movable covers, the latter are adapted to assume an inclined position.

In testimony whereof I affix my signature in presence of two witnesses.

CARL ALOYS GRÜNEWALD.

Witnesses:
 JEAN GRUND,
 CARL GRUND.